A. E. MUTH.
Molding Bread.

No. 203,363.                                    Patented May 7, 1878.

UNITED STATES PATENT OFFICE.

AUGUSTUS E. MUTH, OF CINCINNATI, OHIO.

IMPROVEMENT IN MOLDING BREAD.

Specification forming part of Letters Patent No. 203,363, dated May 7, 1878; application filed March 30, 1878.

*To all whom it may concern:*

Be it known that I, AUGUSTUS E. MUTH, of Cincinnati, Hamilton county, Ohio, have invented a new and useful Improvement in the Manufacture of Loaves, of which the following is a specification:

My invention relates to a mode or method of making loaves, which combines the cheapness and dispatch of machine-made bread with certain valuable characteristics of that made by hand.

In manufacturing bread by machinery it is customary to stamp the blocks out of a long slab of dough, which is received on a suitable apron from the kneading-rolls. These blocks are then placed in the pans, and, after acquiring sufficient proof, are baked. Owing to the process of their manufacture, the "grain" or laminations are horizontal, like a pile of sheets of paper, and the panary gases escaping between these layers do not produce their proper effects of plumping the loaf so as to impart to its top the preferred rounding contour, and, after being baked, the loaves dry too rapidly in consequence of the too ready outlet provided for the moisture through the sides of the loaf; and, in addition, such loaves are objectionable from their liability to break asunder horizontally.

I avoid these defects by rolling out the dough from any suitable cracker-machine into a thinner slab, and having cut the same into rectangular blanks or blocks of about double the customary width, I bend the blank into the form of an inverted U, and place these bent forms into the pan. This expedient puts the laminations all parallel to the sides and top of the loaf, so as to confine the gases and give the loaf the desired plump figure. After being baked, the down-turned edges of the blank constitute the bottom crust, and thus become securely locked and prevented from spreading, while at the same time their pores are effectually closed, so as to retain the moisture in the loaf.

Figure 1:
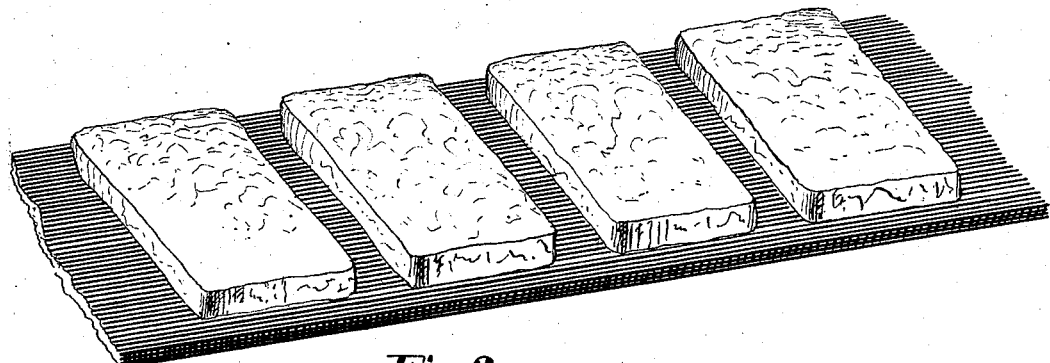
Figure 2:
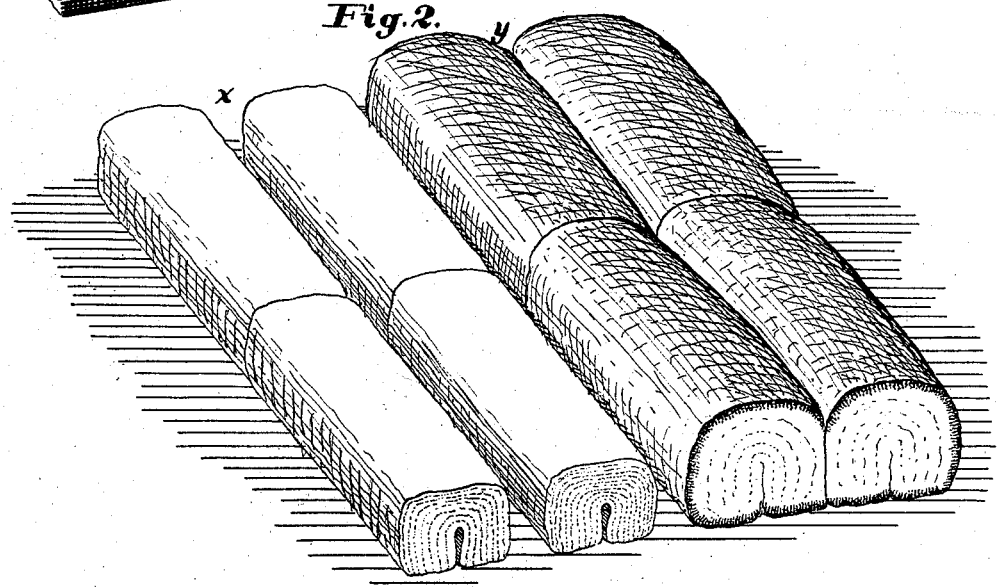
Figure 3:
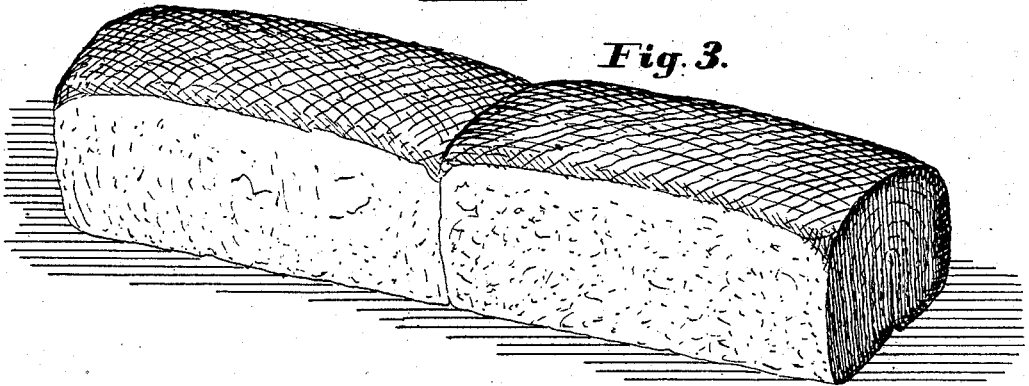

In the accompanying drawings, Figure 1 represents a number of blanks recently severed from the rolled slab by means of a punch or other cutter of the customary kind, but of such dimensions as to cut a blank of considerably greater than the customary width. Each blank is then placed in the pan, as at $x$, Fig. 2, and when "proved" and baked, these blanks expand to the condition shown at $y$, Fig. 2. Fig. 3 shows two separated loaves to a larger scale.

I claim as new and of my invention—

The mode or process of preparing bread-loaves for the oven, consisting of rolling the dough into a thin slab, then dividing the same into blocks and bending them into the form of an inverted U, substantially as and for the purpose set forth.

In testimony of which invention I hereunto set my hand.

AUG. E. MUTH.

Attest:
GEO. H. KNIGHT,
WALTER ALLEN.